(No Model.) 4 Sheets—Sheet 1.

C. G. ANDERSON & J. TREGONING.
BURR REMOVER.

No. 423,979. Patented Mar. 25, 1890.

WITNESSES

INVENTORS

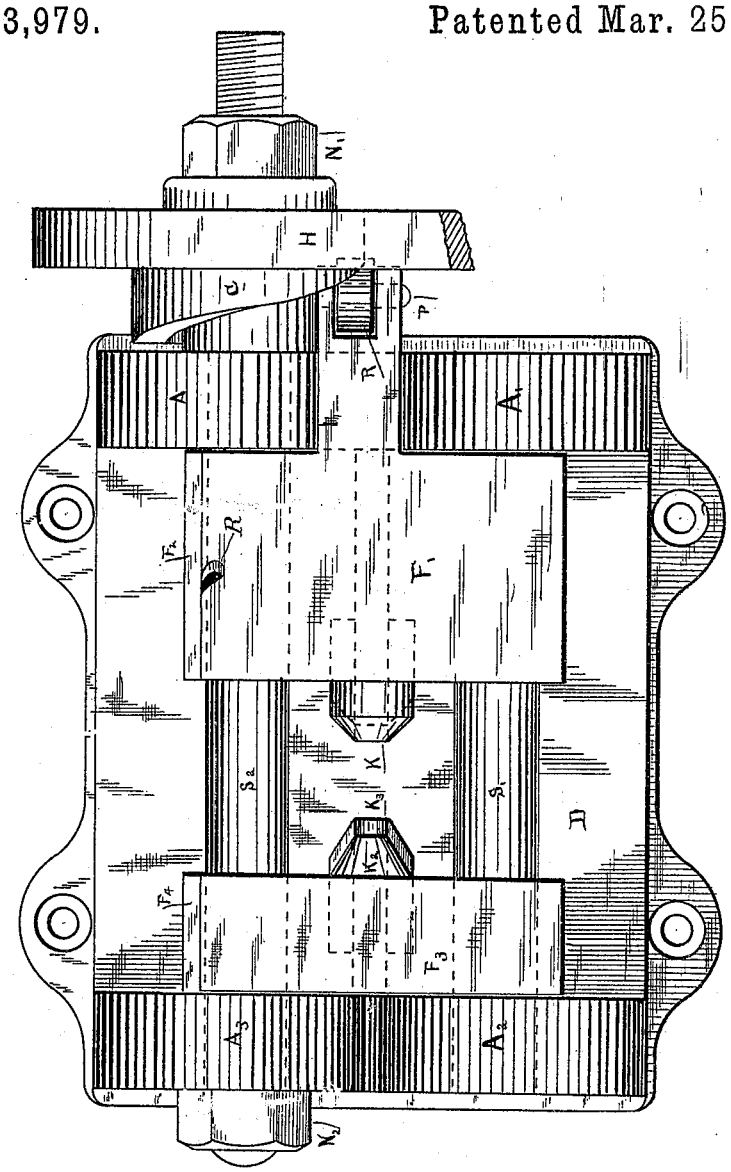

(No Model.) 4 Sheets—Sheet 3.

C. G. ANDERSON & J. TREGONING.
BURR REMOVER.

No. 423,979. Patented Mar. 25, 1890.

WITNESSES

INVENTORS (No Model.) 4 Sheets—Sheet 4.
C. G. ANDERSON & J. TREGONING.
BURR REMOVER.
No. 423,979. Patented Mar. 25, 1890.
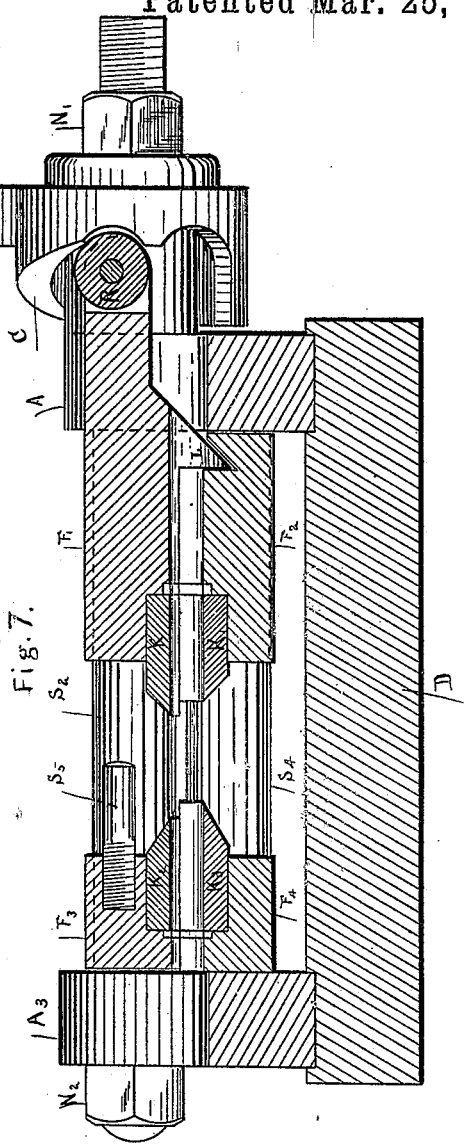
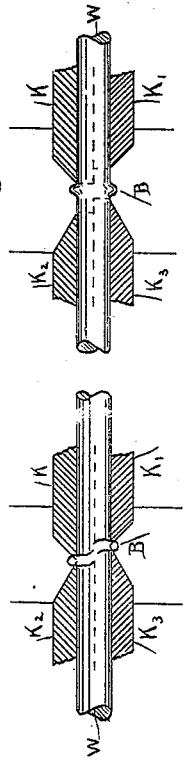
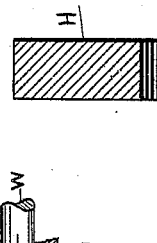
WITNESSES
INVENTORS

UNITED STATES PATENT OFFICE.

CARL GUSTAF ANDERSON AND JOHN TREGONING, OF LYNN, MASSACHUSETTS, ASSIGNORS TO THE THOMSON ELECTRIC WELDING COMPANY, OF MAINE.

BURR-REMOVER.

SPECIFICATION forming part of Letters Patent No. 423,979, dated March 25, 1890.

Application filed November 11, 1889. Serial No. 329,914. (No model.)

*To all whom it may concern:*

Be it known that we, CARL GUSTAF ANDERSON, a subject of the King of Sweden, and JOHN TREGONING, a citizen of the United States, residents of Lynn, in the county of Essex, and State of Massachusetts, have invented certain new and useful Burr-Removers, of which the following is a specification.

Our invention relates to a mechanism for removing burrs or enlargements from metal rods, wires, bars, or other objects.

The invention is designed especially for removing the burr formed by electrically welding sections of copper or other wire together, which burr if present would prevent the passage of the wire through reducing-dies in the operation of drawing the wire to finer sizes. Hitherto the practice has been to remove the burr from the wire by filing, which is a tedious operation. By our invention it can be removed in a few seconds.

The apparatus is also useful for removing burrs from drills, taps, or bars and rods of iron or other metal when produced by the process of electric welding, as described in the patent of Elihu Thomson, No. 347,142.

Our invention is applicable to stock or material of any form in cross-section—that is to say, to wires, bars, rods, or other metal objects whether square, round, hexagonal, or other conformation in cross-section.

Our invention consists in the combination of pairs or sets of cutters or dies adapted to embrace the metal rod or bar and to conform thereto, in combination with suitable means for imparting a longitudinal movement to two or more of such dies or cutters, as will hereinafter be more particularly described.

Our invention consists, also, in the novel combinations and organizations of apparatus and devices more particularly hereinafter described, and then specified in the claims.

Figure 1:
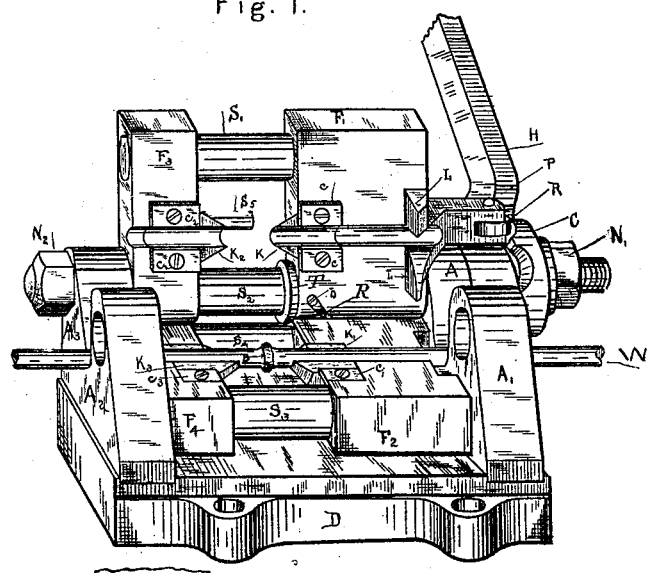
Figure 9:
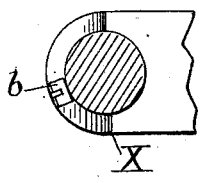
Figure 8:
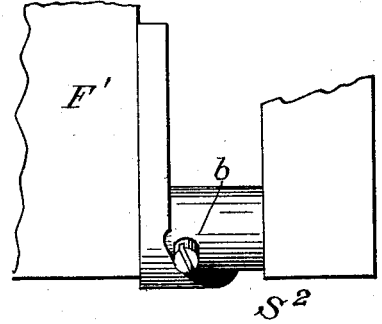
Figure 3:
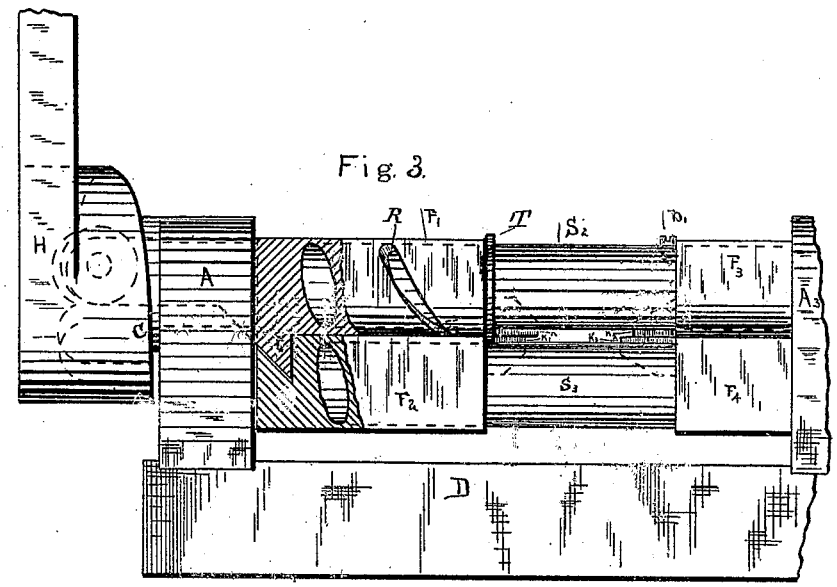
Figure 4:
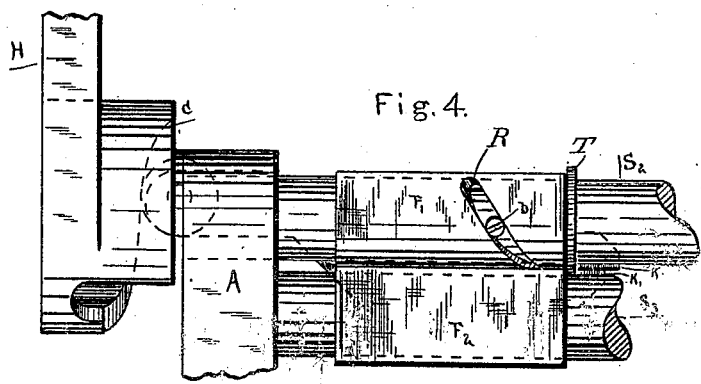

In the accompanying drawings, Figure 1 is a perspective view of an apparatus embodying our invention, and shows the apparatus in position to receive the work or object from which the burr is to be removed. Fig. 2 is a plan of the apparatus with the cutter-heads closed. Fig. 3 is a rear elevation of the apparatus, broken away in part and with the movable cutter-heads in retracted position. Fig. 4 is a partial rear elevation of the same cutter-heads in a position where they have been partially retracted after removing the burr. Figs. 5 and 6 illustrate the action of dies or cutters arranged to operate dissimultaneously upon the burr, as hereinafter described. Fig. 7 is a longitudinal vertical section through the dies or cutters and cutter-heads. Fig. 8 shows in plan a swinging cutter-head modified. Fig. 9 is an end elevation of the modification of Fig. 8.

D is a base-plate, of iron or other suitable material, supporting standards A A' $A^2$ $A^3$.

F' $F^2$ are two cutter-heads supporting, respectively, the cutters K K', which make a pair of cutters adapted to embrace a round wire or rod, each cutter having for that purpose a semicircular cutting-edge.

W is a wire of copper or other material having a burr B to be removed.

The cutters are held in the heads in the usual manner, so that they may be readily attached or detached.

$F^3$ $F^4$ indicate two other cutter-heads carrying the cutters or dies $K^2$ $K^3$, similar to those already mentioned and adapted to embrace the wire or rod W at the opposite side of the burr B. With different forms of wire, rod, bar, or other object in cross-section it is obvious that the form of the cutting-edges would be correspondingly modified in each case, so that when the cutters are brought together they will conform to the shape of such bar in cross-section.

The cutter-heads F' $F^3$ are mounted so that they may be moved transversely to the line of the bar, wire, or rod W when the same is in place. For this purpose we prefer to mount the cutter-heads F' $F^3$ so that they may be swung into the position shown, being pivoted or fulcrumed at one of their sides on a bar $S^2$. The cutter-head $F^2$ is movable on guide bars or rods $S^3$ $S^4$, which may connect the standards, as indicated, being rigidly fixed in the same, or might, if desired, be attached to the cutter-head $F^2$ and work in sockets in the head $F^4$. The head F' is guided by the bars or rods S' $S^2$. The bar $S^2$ passes through the heads F' $F^3$ and is secured in the standards by means of the nuts N' N², and has attached to it a handle H, by which it may be rocked. The guide bar or rod S' is attached to the head F' and works through the head F³ and in an opening in the standard A² when the head F' is moved toward the opposite head F³ longitudinally. In the form of our invention illustrated in the drawings the heads F' F² are the ones which are moved longitudinally after heads F' F³ have been swung down into position over the work.

We prefer to operate the movable heads by some actuating mechanism connected to or engaged by the handle-bar H. A convenient device for this purpose is the cam C, fixed to the handle or the hub of the same and adapted to operate on a rearward extension from the head F', carrying a roller R, which rides on a pin P, mounted on such extension. By this means when the head F' is swung down into position the continued movement of the handle-bar H will cause the cam to engage and force the head and its cutter toward the opposite head F³. The head F² is moved at the same time through the intervention of lugs L, projecting from F' and adapted to come down behind a shoulder on the head F² when the heads are closed together, as indicated in Fig. 3.

The heads are retracted or withdrawn by means of a pin b, attached to the rock shaft or bar S² and working in an inclined slot R in the head F'. This pin works to retract the head F' when the handle-bar H is swung upward, but at the end of the longitudinal rearward movement of the head is stopped at the end of the slot or incline by the material of the head, so that a continued upward movement of the handle-bar H and the continued backward rotation of the rock-shaft S² will result in lifting or swinging the head F' back into the position shown in Fig. 1. The head F³ partakes of this transverse swinging movement by reason of its connection with the guide S', which works in an opening in F³, as before described. The rearward movement of the head F² with F' is produced by means of a lug or shoulder T on the cutter-head F', which engages with the cutter-head F² on the side thereof next the guide-bar S⁴.

In place of slot R a cam-surface, such as indicated in plan in Fig. 8, might be formed on the end of the cutter-head F' next the cutter, thus giving to the cam C or other device the entire work of forcing the cutter-heads toward one another and leaving the pin b free, so as to operate only in drawing the head longitudinally backward. In this instance the pin b would be made to engage with a shoulder at X, as shown in the end elevation Fig. 9, for the purpose of swinging the head F' upward transversely after the completion of the longitudinal rearward movement.

The operation of the apparatus is as follows: The parts being in the position shown in Fig. 1, the object having the burr B is placed in position in the cutters K' K³, with the burr in position between the cutters. The handle H is then turned downward, permitting the heads F' F³ to swing downward by rotation upon the rock shaft or bar S², so as to bring the two cutters K K² down upon the bar or rod W. The continued movement of the handle H in the same direction causes the cam C to engage with the head F', and thus propels the head F', and at the same time head F², by means of lugs L, toward the opposite cutter and into engagement with the burr, so as to remove it. In this operation the pin b moves in its slot or on its cam away from the shoulder or stop, and on a reverse movement of the lever H retracts the heads by engagement with such cam or slot R.

To prevent the tendency of the dies to stick in cutting metals, prticularly in the case of copper and similar metals, it is desirable that the cutting-edges of the dies should not engage the burr simultaneously. An arrangement of the dies which will prevent this sticking is shown in Figs. 5 and 6. Thus in Fig. 6 the dies K and K³ first engage the burr and nearly shear it off, the complete severance of the burr from the stock W being effected later by the dies K' K², as indicated in Fig. 5.

What we claim as our invention is—

1. The combination, substantially as described, of the swinging cutter-head and the actuating-handle, and an actuating mechanism operated by said handle and bearing upon a longitudinally-movable cutter-head for actuating the same when the swinging cutter-head has been swung down into position over the work.

2. In a burr-remover, a pair of dies or cutters conforming to the outline of the rod or wire from which the burr is to be removed and properly mounted, so as to be capable of longitudinal movement on said rod or wire.

3. In a burr-remover, the combination of the cutter-heads F' F², carrying cutters adapted to grasp or surround the object, one of said heads being pivoted to swing in a line transverse to the line of movement of the cutters in removing the burr.

4. In a burr-remover, the combination, substantially as described, of two pairs of cutters, swinging heads upon which the upper cutters of the said pairs are respectively mounted, and guides upon which the heads for one of said pairs move longitudinally for the purpose of cutting off the burr.

5. In a burr-remover, longitudinally-movable cutters set to engage the burr at opposite sides thereof dissimultaneously.

6. In a burr-remover, the combination, with a rock-bar, of a cutter-head sleeved thereon, and a cam moving with said rock-bar and engaging the cutter-head, as and for the purpose described.

7. The combination, with the two guided and longitudinally-movable cutter-heads, one of which is pivoted, of a lug or projection from one adapted to engage with the other when the heads are closed.

8. The combination, with the swinging cutter-heads, of rock-shaft S², forming a guide-bar for the movable cutter-head, as and for the purpose described.

9. The combination, with the swinging cutter-heads F′ F³, of the rock-shaft S², upon which they turn, and a guide-bar S′, connecting the heads F′ and F³, upon which, together with the rock-shaft, the head F′ is guided in a longitudinal direction.

10. The combination, substantially as described, of the two pairs of cutter-heads F′ F² F³ F⁴, the guide rods or bars S³ S⁴ S′ S², standards or supports in which the bar S² may rock, an actuating-handle connected to the bar S², and an actuating mechanism operated by said handle for forcing the movable cutter-heads toward the work in a longitudinal direction.

11. The combination, substantially as described, of the swinging cutter-heads F′ F³, the guide and rock shaft S², around which they swing, an actuating-handle H, connected to the rock-shaft, and a cam C, for engaging with the movable cutter-head after the same has been brought down into position over the work and forcing the same with its cutter longitudinally toward the opposite head and cutter.

12. The combination, with the rock-shaft and the longitudinally-movable cutter-head guided thereon, of an incline or cam and a pin for retracting the cutter-head, and a stop or shoulder for the pin, whereby after the shaft has been rotated to withdraw the head longitudinally the continuance of the rocking movement will swing the cutter-head transversely back from the work.

Signed at Lynn, in the county of Essex and State of Massachusetts, this 8th day of November, A. D. 1889.

CARL GUSTAF ANDERSON.
JOHN TREGONING.

Witnesses:
  J. WESLEY GIBBONEY,
  JOSEPH H. JENKINS.